(12) United States Patent
Kim et al.

(10) Patent No.: US 6,689,531 B2
(45) Date of Patent: Feb. 10, 2004

(54) RESIST COMPOSITION

(75) Inventors: Sang Tae Kim, Iksan (KR); Seung Jin Kang, Iksan (KR); Shi Jin Sung, Iksan (KR); Masumi Suetsugu, Toyonaka (JP); Airi Yamada, Ibaraki (JP)

(73) Assignees: Sumitomo Chemical Company, Limited, Osaka (JP); Dongwoo Fine-Chem Co., Ltd., Chunbuk (KR)

( * ) Notice: Subject to any disclaimer, the term of this patent is extended or adjusted under 35 U.S.C. 154(b) by 10 days.

(21) Appl. No.: 10/228,190

(22) Filed: Aug. 27, 2002

(65) Prior Publication Data

US 2003/0119957 A1 Jun. 26, 2003

(30) Foreign Application Priority Data

Aug. 29, 2001 (JP) ........................................ 2001-259237

(51) Int. Cl.$^7$ .............................................. G03F 7/023
(52) U.S. Cl. ........................ 430/191; 430/165; 430/192; 430/193; 430/287.1; 430/288.1
(58) Field of Search ................................ 430/191, 192, 430/193, 165, 287.1, 288.1; 528/152

(56) References Cited

U.S. PATENT DOCUMENTS

| 5,124,235 | A | * | 6/1992 | Fukui et al. | ............. | 430/281.1 |
| 5,340,687 | A | * | 8/1994 | Honda | ........................ | 430/192 |
| 6,338,936 | B1 | * | 1/2002 | Ichikawa et al. | ........ | 430/285.1 |

FOREIGN PATENT DOCUMENTS

| JP | 62-241978 A | 10/1987 |
| JP | 11-84126 A | 3/1999 |

* cited by examiner

Primary Examiner—John S. Chu
(74) Attorney, Agent, or Firm—Birch, Stewart, Kolasch & Birch, LLP

(57) ABSTRACT

A resist composition showing excellent close adherence at the interface of a substrate and a resist, improving problems in wet etching, having excellent sensitivity and resolution, and also showing excellent resist performances, and comprising a compound of the general formula (I):

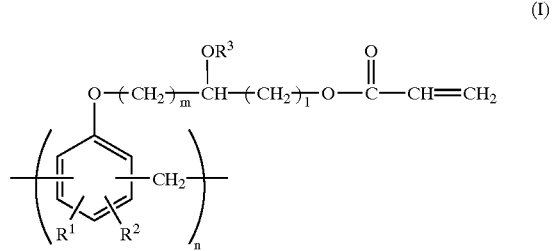

(I)

wherein, $R^1$ and $R^2$ represent each independently a hydrogen atom or an alkyl group, $R^3$ represents a hydrogen atom, alkyl group, aryl group, aralkyl group, alkenyl group, alkylcarbonyl group, arylcarbonyl group or aralkylcarbonyl group, n represents an integer of 1 to 40, m represents an integer of 1 to 5, and l represents an integer of 1 to 5, is provided.

9 Claims, No Drawings

RESIST COMPOSITION

BACKGROUND OF THE INVENTION

1. Field of the Invention

The present invention relates to a resist composition used for fine processing of semiconductors.

2. Prior Art

In general, a photolithography process is used for producing integrated circuits and liquid crystal display elements. It is known that as the resist used in such a process, compositions containing a novolak resin and a dissolution inhibiting agent having a quinone diazide group are suitable, and such compositions are used widely in lithography using g line, i line and the like. However, even these resists revealed a necessity for improvement in close adherence in a wet etching process and heat resistance in a plasma etching process, for precise formation of fine patterns.

Recently, with progress in higher integration, there occurs a requirement for capability of precise formation of submicron fine patterns. Excimer laser lithography is paid to attention since it enables production of 64 M DRAM to 1 G DRAM. As the resist suitable for such an excimer laser lithography process, there is a tendency to adoption of a so-called chemical amplification type resist utilizing chemical amplification effect of an acid catalyst. In the case of the chemical amplification type resist, an acid is generated from an acid generating agent at parts irradiated with radiation, and solubility of the irradiated parts in an alkali developer is changed in a reaction using this acid as a catalyst, by the subsequent heat treatment (post exposure bake: hereinafter, abbreviated as PEB) in some cases. By this, positive or negative patterns are provided.

These resists are generally a composition showing high transparency at exposure wavelength, since high resolution is required. For example, as the resist for KrF excimer laser lithography, often used are poly(p-hydroxystyene) based resins in which a part of phenolic hydroxyl groups is protected with a group dissociating by the action of an acid. However, when wet etching treatment and the like are conducted using these chemical amplification type resists, there is a problem that peeling of a formed pattern from the edge due to insufficient close adherence at the interface of a substrate with a resist, reverse influence due to impregnation of etching liquid and the like are caused.

SUMMARY OF THE INVENTION

The object of the present invention is to provide a resist composition, particularly a positive resist composition giving improved close adherence at the interface of a substrate with a resist, improving the problems in wet etching treatment, and excellent in sensitivity, resolution and heat resistance.

The present inventors have intensively studied, and resultantly found that by containing a specific compound, a resist composition giving improved close adherence at the interface of a substrate with a resist and capable of improving the problems in wet etching treatment is obtained. Based on this findings and further various studies, the present invention was completed.

Namely, the present invention relates to [1] a resist composition comprising a compound of the general formula (I):

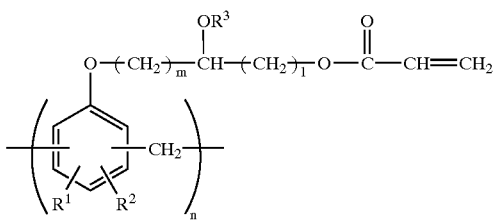

wherein, $R^1$ and $R^2$ represent each independently a hydrogen atom or an alkyl group, $R^3$ represents a hydrogen atom, alkyl group, aryl group, aralkyl group, alkenyl group, alkylcarbonyl group, arylcarbonyl group or aralkylcarbonyl group provided that the alkyl group, aryl group, aralkyl group, alkenyl group, alkylcarbonyl group, arylcarbonyl group and aralkylcarbonyl group may be optionally substituted with a carboxy group, oxycarbonyl group, hydroxy group, alkoxy group or alkyl group, n represents an integer of 1 to 40, m represents an integer of 1 to 5, and l represents an integer of 1 to 5.

Further, the present invention relates to [2] a positive resist composition comprising an alkali-soluble resin, a dissolution inhibiting agent and a compound of the general formula (I).

Furthermore, the present invention relates to [3] a chemical amplification type positive resist composition comprising a resin insoluble or poorly soluble itself in an alkali aqueous solution but becoming soluble in an alkali aqueous solution by the action of an acid, an acid generating agent and a compound of the above-mentioned general formula (I).

DETAILED DESCRIPTION OF PREFERRED EMBODIMENTS

The resist composition of the present invention is characterized in that it comprises a compound of the above-mentioned formula (I). The compound of the formula (I) can be used alone or in combination of two or more.

In the formula (I), $R^1$ and $R^2$ represent each independently a hydrogen atom or an alkyl group, preferably a hydrogen atom or an alkyl group having 1 to 4 carbon atoms, further preferably a hydrogen atom or a methyl group.

$R^3$ represents a hydrogen atom, alkyl group, aryl group, aralkyl group, alkenyl group, alkylcarbonyl group, arylcarbonyl group or aralkylcarbonyl group, preferably a hydrogen atom, alkyl group having 1 to 10 carbon atoms, aryl group having 6 to 15 carbon atoms, aralkyl group having 7 to 15 carbon atoms, alkenyl group having 2 to 10 carbon atoms, alkylcarbonyl group having 2 to 10 carbon atoms, arylcarbonyl group having 7 to 15 carbon atoms or aralkylcarbonyl group having 7 to 15 carbon atoms. Among the above, a hydrogen atom, alkylcarbonyl group having 2 to 10 carbon atoms, arylcarbonyl group having 7 to 15 carbon atoms and aralkylcarbonyl group having 7 to 15 carbon atoms are more preferable.

The alkyl group, aryl group, aralkyl group, alkenyl group, alkylcarbonyl group, arylcarbonyl group or aralkylcarbonyl group may be optionally substituted with a carboxy group, oxycarbonyl group, hydroxy group, alkoxy group or alkyl group.

The alkyl group, alkenyl group include straight chain, branched and cyclic groups.

As $R^3$, particularly a group represented by the following formula (II) is preferable.

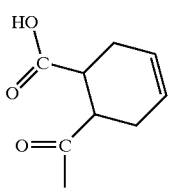

n represents an integer of 1 to 40, preferably of 1 to 20. m represents an integer of 1 to 5, and l represents an integer of 1 to 5.

The end of the compound of the formula (I) is a hydrogen atom.

The compound of the general formula (I) preferably has a weight-average molecular weight measured by gel permeation chromatography (GPC) in terms of polystyrene of 500 to 20000.

Specific examples of the compound corresponding to the formula (I) include the following compounds.

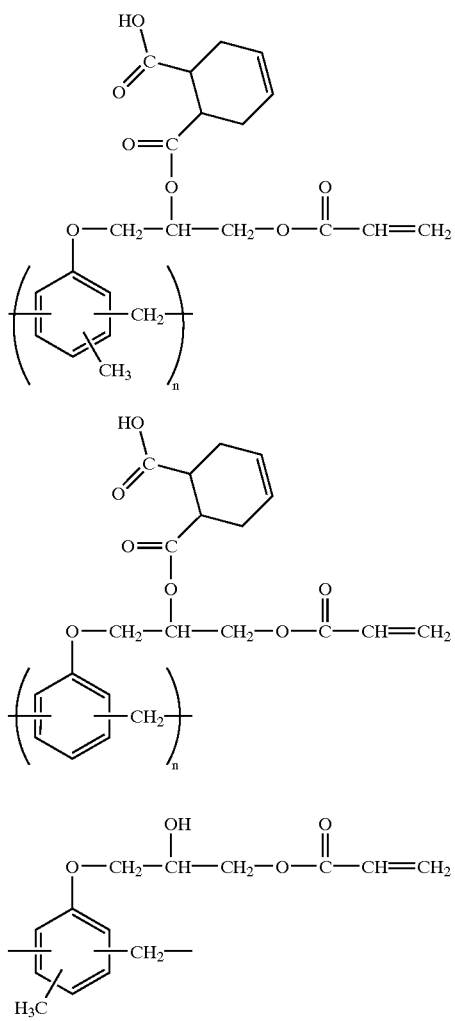

A compound of the formula (I) wherein $R^3$ represents H, such as a compound of the formula (IIIc) is obtained by adding an unsaturated monocarboxylic acid such as acrylic acid, methacrylic acid or the like, according to a known method, to a novolak epoxy resin such as a cresol novolak epoxy resin, phenol novolak epoxy resin or the like. Further, by effecting an addition reaction to the hydroxyl group (esterification) according to a known method, compounds of the formula (I) wherein $R^3$ represents various groups are obtained. For example, if tetrahydrophthalic anhydride is reacted with a novolak epoxy resin, compounds corresponding to the formula (IIIa) and the formula (IIIb) are obtained.

The compounds of the formula (I) are also commercially available, and exemplified are resins manufactured by Showa Kobunshi K.K. (trade name: PR-310), and the like.

The alkali-soluble resin used in the resist composition of the present invention (composition [2]) is not particularly restricted, and those known in the art can be used. Preferably used are novolak resins. The novolak resin is usually obtained by condensation of a phenol-based compound and an aldehyde in the presence of an acid catalyst. Examples of the phenol-based compound used in production of the novolak resins include phenol, o-, m- or p-cresol, 2,3-, 2,5-, 3,4- or 3,5-xylenol, 2,3,5-trimethylphenol, 2-, 3- or 4-tert-butylphenol, 2-tert-butyl-4- or 5-methylphenol, 2-, 4- or 5-methylresorcinol, 2-, 3- or 4-methoxyphenol, 2,3-, 2,5- or 3,5-dimethoxyphenol, 2-methoxyresorcinol, 4-tert-butylcatechol, 2-, 3- or 4-ethylphenol, 2,5- or 3,5-diethylphenol, 2,3,5-triethylphenol, 2-naphthol, 1,3-, 1,5- or 1,7-dihydroxynaphthalene, polyhydroxytriphenylmethane-based compounds obtained by condensation of xylenol and hydroxybenzaldehyde, and the like. These phenol compounds can be used alone or in combination of two or more.

Examples of the aldehyde used in production of the novolak resin include aliphatic aldehydes such as formaldehyde, acetaldehyde, propionaldehyde, n-butylaldehyde, isobutylaldehyde, acrolein or crotonaldehyde; alicyclic aldehydes such as cyclohexanealdehyde, cyclopentanealdehyde, furfural or furylacrolein; aromatic aldehydes such as benzaldehyde, o-, m- or p-methylbenzaldehyde, p-ethylbenzaldehyde, 2,4-, 2,5-, 3,4- or 3,5-dimethylbenzaldehyde or o-, m- or p-hydroxybenzaldehyde; aromatic aliphatic aldehydes such as phenylacetaldehyde or cinnamic aldehyde; and the like. These aldehydes can also be used each alone or in combination of two or more if necessary. Of these aldehydes, formaldehyde is preferably used since it is industrially obtainable easily.

Examples of the acid catalyst used in condensation of a phenol-based compound with an aldehyde include inorganic acids such as hydrochloric acid, sulfuric acid, perchloric acid or phosphoric acid; organic acids such as formic acid, acetic acid, oxalic acid, trichloroacetic acid or p-toluenesulfonic acid; divalent metal salts such as zinc acetate, zinc chloride or magnesium acetate. These acid catalysts can also be used each alone or in combination of two or more. The condensation reaction can be conducted according an ordinary method, for example, conducted at temperatures in the range from 60 to 120° C. for about 2 to 30 hours.

Regarding novolak resins obtained by condensation, it is preferable that components of lower molecular weight are removed by performing operations such as fractionation and the like, for narrowing the molecular weight distribution, to give a resin mainly composed of components of higher molecular weights. Specifically, it is preferable that when the novolak resin is measured by gel permeation chromatography (GPC) using polystyrene as a standard, the area ratio of components having molecular weights of 1000 or less is 25% or less, more preferably 20% or less based on the total pattern area excepting unreacted monomers.

The dissolution inhibiting agent in the present invention acts on an alkali-soluble resin for suppressing solution speed. As the dissolution inhibiting agent, quinone diazide compounds, specifically, o-quinone diazide sulfonates of compounds having a phenolic hydroxyl group are usually used. Preferable are 1,2-naphthoquinone diazide-5-sulfonates, 1,2-naphthoquinone diazide-4-sulfonates or 1,2-benzoquinone diazide-4-sulfonates of polyhydroxy compounds having at least three phenolic hydroxyl groups. Such quinone diazide compounds can be used each alone or in combination of two or more. As the compound having a phenolic hydroxyl group to be quinone diazide-sulfonated, for example, tri-, tetra- or penta-hydroxybenzophenones; polynuclear novolak compounds such as tri-nuclear body, tetra-nuclear body, penta-nuclear body and hexa-nuclear body in which two or more phenol nuclei optionally substituted with an alkyl group, specifically, a phenol nucleus, cresol nucleus, xylenol nucleus and the like are bonded in any order via methylene, are listed.

The quinone diazide sulfonate can be produced by reacting the above-mentioned compound having a phenolic hydroxyl group with an o-quinone diazide sulfonic halide in a suitable solvent in the presence of a base such as triethylamine. After reaction, the intended quinone diazide sulfonate can be obtained by suitable post treatment. Exemplified are a method in which a reaction mass is mixed with water to precipitate the intended compound which is filtrated and dried to give an ester in the form of powder, a method in which a resist solvent such as 2-heptanone and the like is added to a reaction mass, the resulted mixture is washed with water and separated, then, the reaction solvent is removed by distillation and equilibrium flash distillation, to obtain an ester in the form of resist solvent solution. The equilibrium flash distillation here referred to is a kind of continuous distillation operation and a distillation method in which a part of a liquid mixture is vaporized, and the generated gas phase is allowed to contact with the liquid phase sufficiently, and a gas is separated from liquid when reached equilibrium. This is suitable for concentration of a heat labile substance since vaporization efficiency is extremely excellent, vaporization occurs almost momentarily, and gas phase and liquid phase reaches immediately to equilibrium condition, consequently, concentration is sufficiently attained even if gas phase and liquid phase are separated immediately, and heating time may be short.

Next, the chemical amplification type positive resist composition of the present invention (composition [3]) is characterized in that it comprises a resin insoluble or poorly soluble itself in an alkali aqueous solution but becoming soluble in an alkali aqueous solution by the action of an acid, an acid generating agent and a compound of the above-mentioned general formula (I). As the resin insoluble or poorly soluble itself in an alkali aqueous solution but becoming soluble in an alkali aqueous solution by the action of an acid in the present invention, resins having a protective group which can be dissociated by the action of an acid are mentioned.

In such a chemical amplification positive resist, an acid generated in parts irradiated with radiation is diffused by the subsequent heat treatment (post exposure bake), by this, protective groups of a resin and the like are dissociated and an acid is regenerated, and the parts irradiated with radiation are made to be alkali-soluble.

As such a resin having a protective group which can be dissociated by the action of an acid, and insoluble or poorly soluble itself in an alkali but becoming alkali-soluble by the action of an acid after dissociation of the above-mentioned protective group, those obtained by introducing a protective group which can be dissociated by the action of an acid into an alkali-soluble resins can be listed. As the alkali-soluble resin, resins having a phenol skeleton and resins having a (meth)acrylic acid skeleton, such as polyvinylphenol resins, polyisopropenylphenol resins, resins obtained by partial alkyl-etherification of hydroxyl groups in these polyvinylphenol resins or polyisopropenylphenol resins, copolymerized resins of vinylphenol or isopropenylphenol with other polymerizable unsaturated compounds are exemplified.

As such a group showing a solution inhibiting ability on an alkali aqueous solution but instable to an acid, groups in which quaternary carbon is bonded to an oxygen atom such as tert-butyl, tert-butoxycarbonyl or tert-butoxycarbonylmethyl; acetal type groups such as tetrahydro-2-pyranyl, tetrahydro-2-furyl, 1-ethoxyethyl, 1-(2-methylpropoxy)ethyl, 1-(2-methoxyethoxy)ethyl, 1-(2-acetoxyethoxy)ethyl, 1-[2-(1-adamantyloxy)ethoxy]ethyl or 1-[2-(1-adamanthanecarbonyloxy)ethoxy]ethyl; residues of non-aromatic cyclic compounds such as 3-oxocyclohexyl, 4-methyltetrahydro-2-pyron-4-yl (derived from mevalonic lactone), 2-methyl-2-adamantyl or 2-ethyl-2-adamantyl, and the like are exemplified.

These groups shall be substituted for hydrogen on a phenolic hydroxyl group or hydrogen on a carboxyl group.

These protective groups can be introduced into an alkali-soluble resin having a phenolic hydroxyl group or a carboxyl group, by a protective group introduction reaction according to a usual esterification reaction. The above-mentioned resin can also be obtained by copolymerization using, as one monomer, an unsaturated compound having such a group.

The acid generating agent in the composition of the present invention include various compounds generating an acid by irradiating the substance itself or a resist composition containing this substance with radiation. As the acid generating agent, for example, onium salts, halogenated alkyltriazine-based compounds, disulfone-based compounds, compounds having a diazomethanesulfonyl skeleton, sulfonate-based compounds and the like are listed. Specific examples of such acid generating agents include the following compounds.

Diphenyliodonium trifluoromethanesulfonate,
4-methoxyphenylphenyliodinium hexafluoroantimonate,
4-methoxyphenylphenyliodinium trifluoromethanesulfonate,
bis(4-tert-butylphenyl)iodonium tetrafluoroborate
bis(4-tert-butylphenyl)iodonium hexafluorophosphate,
bis(4-tert-butylphenyl)iodonium hexafluoroantimonate
bis(4-tert-butylphenyl)iodonium trifluoromethanesulfonate,
triphenylsulfonium hexafluorophosphate,
triphenylsulfonium hexafluoroantimonate,
triphenylsulfonium trifluoromethanesulfonate,
4-methoxyphenyldiphenylsulfonium hexafluoroantimonate,
4-methoxyphenyldiphenylsulfonium trifluoromethanesulfonate,
p-tolyldiphenylsulfonium trifluoromethanesulfonate,
p-tolyldiphenylsulfonium perfluorobutanesulfonate,
p-tolyldiphenylsulfonium perfluorooctanesulfonate,
2,4,6-trimethylphenyldiphenylsulfonium trifluoromethanesulfonate, 4-tert-butylphenyldiphenylsulfonium trifluoromethane-sulfonate, 4-phenylthiophenyldiphenylsulfonium hexafluorophosphate, 4-phenylthiophenyldiphenylsulfonium hexafluoroantimonate, 1-(2-naphtholylmethyl)thiolanium hexafluoroantimonate, 1-(2-naphtholylmethyl)thiolanium trifluoromethane-sulfonate, 4-hydroxy-1-naphthyldimethylsulfonium hexafluoroantimonate, 4-hydroxy-1-naphthyldimethylsulfonium trifluoromethanesulfonate, cyclohexylmethyl(2-oxocyclohexyl)sulfonium trifluoromethanesulfonate, cyclohexylmethyl(2-oxocyclohexyl)sulfonium perfluorobutanesulfonate, cyclohexylmethyl(2-oxycyclohexyl)sulfonium perfluorootcanesulfonate, 2-methyl-4,6-bis(trichloromethyl)-1,3,5-triazine, 2,4,6-tris(trichloromethyl)-1,3,5-triazine 2-phenyl-4,6-bis(trichloromethyl)-1,3,5-triazine, 2-(4-chlorophenyl)-4,6-bis(trichloromethyl)-1,3,5-triazine, 2-(4-methoxyphenyl)-4,6-bis(trichloromethyl)-1,3,5-triazine, 2-(4-methoxy-1-naphthyl)-4,6-bis(trichloromethyl)-1,3,5-triazine, 2-(benzo[d][1,3]dioxolan-5-yl)-4,6-bis(trichloromethyl)-1,3,5-triazine, 2-(4-methoxystyryl)-4,6-bis(trichloromethyl)-1,3,5-triazine, 2-(3,4,5-trimethoxystyryl)-4,6-bis(trichloromethyl)-1,3,5-triazine, 2-(3,4-dimethoxystyryl)-4,6-bis(trichloromethyl)-1,3,5-triazine, 2-(2,4-dimethoxystyryl)-4,6-bis(trichloromethyl)-1,3,5-triazine, 2-(2-methoxystyryl)-4,6-bis(trichloromethyl)-1,3,5-triazine, 2-(4-butoxystyryl)-4,6-bis(trichloromethyl)-1,3,5-triazine, 2-(4-pentyloxystyryl)-4,6-bis(trichloromethyl)-1,3,5-triazine, diphenyl disulfone, di-p-tolyl disulfone bis(phenylsulfonyl)diazomethane, bis(4-chlorophenylsulfonyl)diazomethane, bis(p-tolylsulfonyl)diazomethane, bis(4-tert-butylphenylsulfonyl)diazomethane, bis(2,4-xylylsulfonyl)diazomethane, bis(cyclohexylsulfonyl)diazomethane, (benzoyl)(phenylsulfonyl)diazomethane, 1-benzoyl-1-phenylmethyl p-toluenesulfonate (generally called benzoin tosylate), 2-benzoyl-2-hydroxy-2-phenylethyl p-toluenesulfonate (generally called α-methylolbenzoin tosylate), 1,2,3-benzenetolyl trismethanesulfonate, 2,6-dinitrobenzyl p-toluenesulfonate, 2-nitrobenzyl p-toluenesulfonate, 4-nitrobenzyl p-toluenesulfonate, N-(phenylsulfonyloxy)succinimide, N-(trifluoromethylsulfonyloxy)succinimide, N-(trifluoromethylsulfonyloxy)phthalimide, N-(trifluoromethylsulfonyloxy)-5-norbornene-2,3-dicarboxyimide, N-(trifluoromethylsulfonyloxy)naphthalimide, N-(10-camphorsulfonyloxy)naphthalimide and the like.

The chemical amplification type positive resist composition [3] of the present invention can improve deterioration in abilities due to deactivation of an acid following leaving after exposure, by adding as a quencher a basic nitrogen-containing organic compound, such as amines. Specific examples of the basic nitrogen-containing organic compound used as a quencher include compounds of the following formulae.

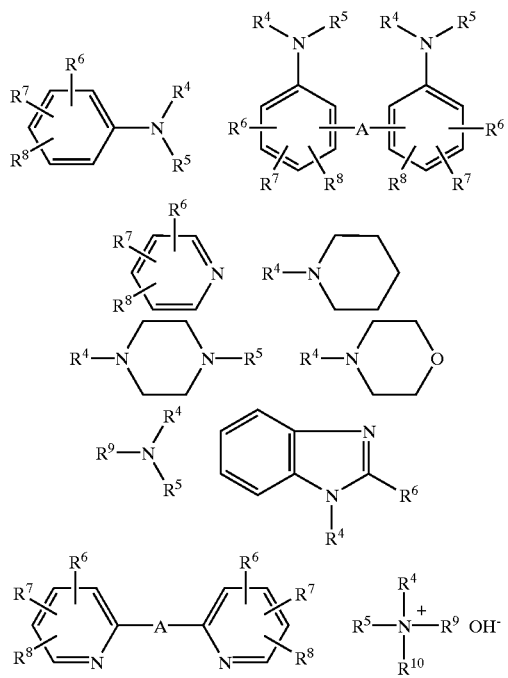

In the above formulae, $R^4$, $R^5$ and $R^{10}$ represent each independently hydrogen, alkyl, cycloalkyl or aryl. The alkyl, cycloalkyl or aryl may be each independently substituted with, a hydroxyl group, amino group or alkoxy group having 1 to 6 carbon atoms. This amino group may be substituted with an alkyl group having 1 to 4 carbon atoms. This alkyl preferably has about 1 to 6 carbon atoms, this cycloalkyl preferably has about 5 to 10 carbon atoms, and this aryl preferably has about 6 to 10 carbon atoms.

$R^6$, $R^7$ and $R^8$ represent each independently hydrogen, alkyl, cycloalkyl, aryl or alkoxy. The alkyl, cycloalkyl, aryl or alkoxy may be each independently substituted with a hydroxyl group, amino group or alkoxy group having 1 to 6 carbon atoms. This amino group may be substituted with an alkyl group having 1 to 4 carbon atoms. This alkyl preferably has about 1 to 6 carbon atoms, this cycloalkyl preferably has about 5 to 10 carbon atoms, this aryl preferably has about 6 to 10 carbon atoms, and this alkoxy preferably has about 1 to 6 carbon atoms.

$R^9$ represents alkyl or cycloalkyl. The alkyl or cycloalkyl may be each independently substituted with a hydroxyl group, amino group or alkoxy group having 1 to 6 carbon atoms. This amino group may be substituted with an alkyl group having 1 to 4 carbon atoms. This alkyl preferably has about 1 to 6 carbon atoms, and this cycloalkyl preferably has about 5 to 10 carbon atoms.

A represents alkylene, carbonyl, imino, sulfide or disulfide. The alkylene preferably has about 2 to 6 carbon atoms.

$R^4$ to $R^{10}$ may have any of a linear structure and a branched structure providing they can take both structures.

Specific examples of such compounds include hexylamine, heptylamine, octylamine, nonylamine, decylamine, aniline, 2-, 3- or 4-methyaniline, 4-nitroaniline, 1- or 2-naphthylamine, ethylenediamine, tetramethylenediamine, hexamethylenediamine, 4,4'-diamino-1,2-diphenylethane, 4,4'-diamino-3,3'-dimethyldiphenylmethane, 4,4'-diamino-3,3'-diethyldiphenylmethane, dibutylamine, dipentylamine, dihexylamine, diheptylamine, dioctylamine, dinonylamine, didecylamine, N-methylaniline, piperidine, diphenylamine, triethylamine, trimethylamine, tripropylamine, tributylamine, tripentylamine, trihexylamine, triheptylamine, trioctylamine, trinonylamine, tridecylamine, methyldibutylamine, methyldipentylamine, methyldihexylamine, methyldicyclohexylamine, methyldiheptylamine, methyldioctylamine, methyldinonylamine, methyldidecylamine, ethyldibutylamine, ethyldipentylamine, ethyldihexylamine, ethyldiheptylamine, ethyldioctylamine, ethyldinonylamine, ethyldidecylamine, dicyclohexylmethylamine, tris[2-(2-methoxyethoxy)ethyl]amine, triisopropanolamine, N,N-dimethylaniline, 2,6-isopropylaniline, imidazole, pyridine, 4-methylpyridine, 4-methylimidazole, bipyridine, 2,2'-dipyridylamine, di-2-pyridylketone, 1,2-di(2-pyridyl)ethane, 1,2-di(4-pyridyl)ethane, 1,3-di(4-pyridyl)propane, 1,2-bis(2-pyridyl)ethylene, 1,2-bis(4-pyridyl)ethylene, 1,2-bis(4-pyridyloxy)ethane, 4,4'-dipyridyl sulfide, 4,4'-dipyridyl disulfide, 1,2-bis(4-pyridyl)ethylene, 2,2'-dipicolylamine, 3,3'-dipicolylamine, tetramethylammonium hydroxide, tetraisopropylammonium hydroxide, tetrabutylammonium hydroxide and the like.

It is preferable that the chemical amplification type positive resist composition of the present invention contains an acid generating agent in an amount of 0.3 to 30 parts by weight, and a compound of the formula (I) in an amount of 0.2 to 50 parts by weight, more preferably of 0.5 to 20 parts by weight based on 100 parts by weight of a resin insoluble or poorly soluble itself in an alkali but becoming soluble in an alkali by the action of an acid, in the composition.

When a basic compound is used as a quencher, it is preferable that the composition of the present invention contains the basic compound in an amount of 0.001 to 5 parts by weight, 1 more preferably 0.01 to 1 part by weight based on 100 parts by weight of the above-mentioned resin in the resist composition.

The composition of the present invention can also contain a small amount of various additives such as sensitizers, solution suppressing agents, other resins, surfactants, stabilizers, dyes and the like, if necessary.

The resist composition of the present invention is usually used as a liquid containing the above-mentioned components dissolved in a solvent, and the liquid is applied on a substrate such as a silicon wafer and the like according to an ordinary method such as spin coating and the like.

Any solvents may be used here providing they dissolve each component, show suitable drying speed, and give a uniform and smooth film after evaporation of a solvent. Solvents generally used in this field can be used as the solvent. Examples thereof include glycol ether esters such as ethylcellosolve acetate, methylcellosolve acetate or propylene glycolmonomethyl ether acetate; esters such as ethyl lactate, butyl acetate, amyl acetate or ethyl pyruvate; ketones such as acetone, methyl isobutyl ketone, 2-heptanone or cylohexanone; and cyclic esters such as γ-butyrolactone; and the like. These solvents can be used each alone or in combination of two or more.

On a resist film applied on a substrate and dried, exposure treatment for patterning is performed, then, heating treatment for promoting a protective group-removing reaction is conducted. Thereafter, the resist film is developed with an alkali developer. The alkali developer used here can be selected from various alkaline aqueous solutions used in this field, and generally, often used are aqueous solutions of tetramethylammonium hydroxide and (2-hydroxyethyl)trimethylammonium hydroxide.

The following examples will illustrate the present invention further specifically, but do not limit the scope of the present invention at all. In examples, % and parts representing content or use amount are by weight unless otherwise stated. The weight-average molecular weight (Mw) and polydispersion (Mw/Mn) were measured by gel permeation chromatography using polystyrene as a standard.

REFERENCE EXAMPLE 1

Synthesis of Novolak Resin (1)

A mixture of 244.3 g of 2,5-xylenol, 390.8 g of methanol, 9.5 g of p-toluenesulfonic acid and 48.8 g of salicylaldehyde was heated at 80° C. while stirring for 4 hours. After completion of the reaction, to the resulted reaction mixture was added 652.6 g of methyl isobutyl ketone, then, the mixture was distilled until the inner temperature reached 85° C., to distill methanol out of the system. Then, 97.3 g of m-cresol and 118.9 g of p-cresol were added, and 227.3 g of 37% formalin was dropped over 40 minutes. After completion of dropping, they were reacted for 15 hours. Then, the mixture was washed with water and dehydrated to obtain a methyl isobutyl ketone solution of a novolak resin. The weight-average molecular weight in terms of polystyrene by GPC was 4100. 300 g of this novolak resin (resin content: 38.5%) was charged in a 3 L bottom-discharging type separable flask. To this was added 299 g of methyl isobutyl ketone and 408 g of n-heptane, and the mixture was stirred at 60° C. for 30 minutes, then, allowed to stand still and separated. 300 g of 2-heptanol was added to the lower layer obtained by separation, then, methyl isobutyl ketone and n-heptane were distilled off by an evaporator, to obtain a 2-heptanone solution of a novolak resin. The weight-average molecular weight in terms of polystyrene by GPC was 7200. This resin is named A1.

REFERENCE EXAMPLE 2

Synthesis of Novolak Resin (2)

An operation was carried out according to the same manner as in Reference Example 1, except that p-cresol was not added, the addition amount of m-cresol was changed to 216.3 g and the addition amount of formalin was changed to 259.7 g. A novolak resin in a methyl isobutyl ketone solution after water-washing and dehydration had a weight-average molecular weight in terms of polystyrene by GPC of 4300. To 300 g of this novolak resin solution (resin content: 37.3%) was added 366 g of methyl isobutyl ketone and 484 g of n-heptane, and an operation was carried out according to the same manner as in Reference Example 1, to obtain a 2-heptanone solution of a novolak resin. The weight-average molecular weight in terms of polystyrene by GPC was 6700. This resin is called A2.

REFERENCE EXAMPLE 3

Synthesis of poly(p-1-ethoxyethoxystyrene/p-hydroxystyrene)

Into a flask were charged 108.3 g of a solution of poly(p-hydroxystyrene)(weight-average molecular weight: about 15200, degree of dispersion: 1.20 (GPC method: reduced by polystyrene), 30.0 g as the weight of poly(p-hydroxystyrene)), 0.005 g of p-toluenesulfonic acid monohydrate and 102 g of methyl isobutyl ketone, and the mixture was stirred. Into this resin solution was dropped 8.7 g of ethyl vinyl ether (0.12 mol, 0.48 equivalent based on hydroxyl groups in poly(p-hydroxystyrene)) using a dropping funnel. The mixture was stirred at 25° C. for 3 hours, then, to this was added 15 g of methyl isobutylketone and 57 g of ion exchanged water, and the solution was separated. Further, the resulted organic layer was washed with 57 g of ion exchanged water and separated, four times.

The solvent was distilled off from this organic layer, then, to this was added 306 g of propylene glycol monomethyl ether acetate and the solvent was further distilled off, for performing solvent substitution, to obtain 125 g of a solution of a resin in propylene glycol monomethyl ether acetate. The solid component concentration of this resin solution was calculated by a heat mass loss method, to find that it was 30.1%. Further, the ratio of 1-ethoxyethylated hydroxyl groups in hydroxyl groups in poly(p-hydroxystyrene) was measured by a nuclear magnetic resonance spectrometer, to find that it was 35.7%. This resin is called resin A3.

REFERENCE EXAMPLE 4

An operation was carried out according to the same manner as in Reference Example 3 except that the use amount of ethyl vinyl ether was changed. The solid component concentration of the resulted resin solution was 30.2%, and the ratio of 1-ethoxyethylated hydroxyl groups in hydroxyl groups in poly(p-hydroxystyrene) was 28.7%. This resin is called resin A4.

REFERENCE EXAMPLE 5

Synthesis of 2-ethyl-2-adamantyl methacrylate/p-acetoxystyrene copolymer (20:80)

Into a flask were charged 39.7 g (0.16 mol) of 2-ethyl-2-adamantyl methacrylate, 103.8 g (0.64 mol) of p-acetoxystyrene and 265 g of isopropanol, and the mixture was heated up to 75° C. under a nitrogen atmosphere. Into this solution was dropped a solution prepared by dissolving 11.05 g (0.048 mol) of dimethyl 2,2'-azobis(2-methylpropionate) in 22.11 g of isopropanol. The mixture was aged for about 0.3 hours at 75° C., and for about 12 hours under reflux, then, diluted with acetone. The reaction solution was poured into a large amount of methanol to precipitate a polymer which was filtrated. The amount of the resulted copolymer of 2-ethyl-2-admantyl methacrylate and p-acetoxystyrene was 250 g (weight of wet cake containing methanol).

REFERENCE EXAMPLE 6

Synthesis of 2-ethyl-2-adamantyl methacrylate/p-hydroxystyrene copolymer (20:80)

Into a flask were charged 250 g of the copolymer of 2-ethyl-2-adamantyl methacrylate and p-acetoxystyrene (20:80) obtained in Reference Example 5, 10.3 g (0.084 mol) of 4-dimethylaminopyridine and 202 g of methanol and the mixture was aged for 20 hours under reflux. After cooling, the reaction solution was neutralized with 7.6 g (0.126 mol) of glacial acetic acid, and precipitated by pouring into a large amount of water. The precipitated polymer was filtrated, and dissolved in acetone. The resulted solution was poured into a large amount of water to cause precipitation. This operation was repeated three times in total, to effect purification. The amount of the resulted copolymer of 2-ethyl-2-adamantyl methacrylate and p-hydroxystyrene was 95.9 g. The weight-average molecular weight was about 8600, the degree of dispersion was 1.65 (GPC method: reduced by polystyrene), and the copolymerization ratio was determined to be about 20:80 by a nuclear magnetic resonance ($^{13}$C-NMR) spectrometer. This resin is called resin A5.

REFERENCE EXAMPLE 7

Synthesis of 2-ethyl-2-adamantyl methacrylate/p-acetoxystyrene copolymer (30:70)

Into a flask were charged 59.6 g (0.24 mol) of 2-ethyl-2-adamantyl methacrylate, 90.8 g (0.56 mol) of p-acetoxystyrene and 279 g of isopropanol, and the mixture was heated up to 75° C. under a nitrogen atmosphere. Into this solution was dropped a solution prepared by dissolving 11.05 g (0.048 mol) of dimethyl 2,2'-azobis(2-methylpropionate) in 22.11 g of isopropanol. The mixture was aged for about 0.3 hours at 75° C., and for about 12 hours under reflux, then, diluted with acetone, and the reaction solution was poured into a large amount of methanol, to precipitate a polymer which was filtrated. The amount of the resulted copolymer of 2-ethyl-2-admantyl methacrylate and p-acetoxystyrene was 250 g (weight of wet cake containing methanol).

REFERENCE EXAMPLE 8

Synthesis of 2-ethyl-2-adamantyl methacrylate/p-hydroxystyrene copolymer (30:70)

Into a flask were charged 250 g of the copolymer of 2-ethyl-2-adamantyl methacrylate and p-acetoxystyrene (30:70) obtained in Reference Example 7, 10.8 g (0.088 mol) of 4-dimethylaminopyridine and 239 g of methanol and the mixture was aged for 20 hours under reflux. After cooling, the reaction solution was neutralized with 8.0 g (0.133 mol) of glacial acetic acid, and precipitated by pouring into a large amount of water. The precipitated polymer was dissolved in acetone, then, poured into a large amount of water to cause precipitation. This operation was repeated three times in total, to effect purification. The amount of the resulted copolymer of 2-ethyl-2-adamentyl methacrylate and p-hydroxystyrene was 102.8 g. The weight-average molecular weight was about 8200, the degree of dispersion was 1.68 (GPC method: reduced by polystyrene), and the copolymerization ratio was determined to be about 30:70 by a nuclear magnetic resonance ($^{13}$C-NMR) spectrometer. This resin is called resin A6.

Examples 1 to 7 and Comparative Example 1

Components shown below were mixed and dissolved, further, filtrated through a fluorine resin filter having a pore diameter of 0.2 μm, to prepare a resist solution.

Resin: Kind and amount are shown in Table 1

Dissolution inhibiting agent: Kind and amount are shown in Table 1

Lower molecular weight alkali-soluble component:

4,4'-(2-hydroxybenzilidene)di-2,6-xylenol Amount is shown in Table 1

Added compound: Kind and amount are shown in Table 1

Alkali dissociating compound:

N-(2-oxobornan-10-ylsulfonyloxy)succinimide Amount is shown in Table 1

| Solvent: | 2-heptanone | 57.0 parts * |
|---|---|---|
| | ethyl lactate | 3.0 parts |

* the amount of 2-heptanone includes that introduced from resin solution

TABLE 1

| Example No. | Added compound and amount thereof | Kind and amount of resin | Kind and amount of solution inhibiting agent | Amount of lower molecular weight alkali-soluble component | Alkali dissociating compound |
|---|---|---|---|---|---|
| Example 1 | C1/3.0 parts | A1/ 3.5 parts A2/ 4.93 parts | B1/1.5 parts B2/1.2 parts B3/2.5 parts | 3.6 parts | 0.3 parts |
| Example 2 | C1/2.3 parts | A1/ 3.2 parts A2/ 5.23 parts | B1/1.5 parts B2/1.2 parts B3/2.5 parts | 3.6 parts | 0.2 parts |
| Example 3 | C1/2.0 parts | A1/ 2.43 parts A2/ 8.0 parts | B1/3.5 parts B2/1.5 parts | 3.2 parts | 0.35 parts |
| Example 4 | C1/1.5 parts | A1/ 5.55 parts A2/ 4.88 parts | B1/3.5 parts B2/1.0 parts B3/1.5 parts | 3.9 parts | none |
| Example 5 | C1/0.5 parts | A1/ 5.35 parts A2/ 5.08 parts | B1/4.0 parts B2/1.0 parts B3/1.0 parts | 3.9 parts | none |
| Example 6 | C1/3.5 parts | A1/ 3.5 parts A2/ 4.93 parts | B1/1.5 parts B2/1.5 parts B3/2.2 parts | 3.5 parts | none |
| Example 7 | C1/5.0 parts | A1/ 3.5 parts A2/ 4.93 parts | B1/1.5 parts B2/1.2 parts B3/2.5 parts | 3.5 parts | 0.3 parts |
| Comparative example 1 | none | A1/5.35 parts A2/5.08 parts | B1/5.0 parts B2/1.0 parts | 3.9 parts | none |

Marks used in the column of the dissolution inhibiting agent mean the following compounds.

B1: Condensate of 4,4'-methylenebis[2-(4-hydroxybenzyl)-3,6-dimethylphenol] and 1,2-naphthoquinone diazide-5-sulfonic chloride at a reaction molar ratio of 1:2 having a structure of the following formula

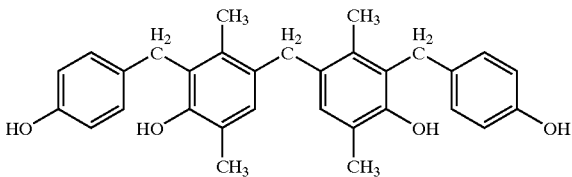

B2: Condensate of 4-[1', 2', 3', 4', 4'A, 9'A-hexahydro-6'-hydroxyspyro[cyclohexane-1,9'-xanthene]-4'A-yl]resorcinol and 1,2-naphthoquinone diazide-5-sulfonic chloride at a reaction molar ratio of 1:3 having a structure of the following formula

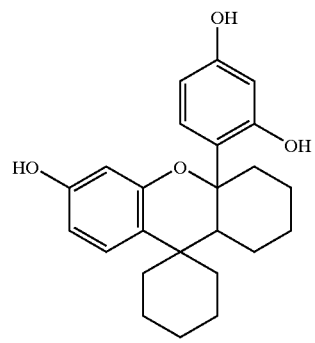

B3: Condensate of 4,4'-methylenebis[2-(2-hydroxy-5-methylbenzyl)-3,6-dimethylphenol] and 1,2-naphthoquinone diazide-5-sulfonic chloride at a reaction molar ratio of 1:2 having a structure of the following formula

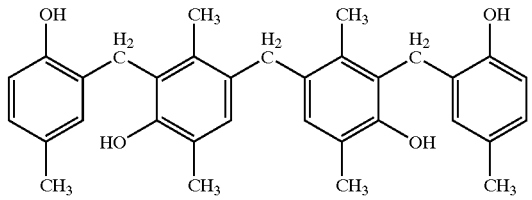

Marks used in the column of "added compound" in Table 1 mean the following compounds.

C1: SC-6100 (manufactured by Miwon)

A compound having a structural unit of the formula (IIIa) and a structural unit of the formula (IIIc) as the main component: catalogue value/solid content (non-volatile content): 70 wt %, acid value (solid component acid value): 85 to 95 mg-KOH/g According to an ordinary method, each resist solution was spin-coated on a silicon wafer, then, pre-baked on a proximity hot plate at 90° C. for 60 seconds, to form a resist film having a film thickness of 1.07 μm. The wafer on which a resist film had been thus formed was exposed through masks of various forms and dimensions using an i line stepper ["NSR i11D", manufactured by Nikon Corp.]. Next, PEB was conducted at 110° C. for 60 seconds on a hot plate, further, paddle development was conducted for 60 seconds with a 2.38% tetramethylammonium hydroxide aqueous solution. The sections of patterns after development were observed by a scanning electron microscope, and sensitivity and resolution were checked as described below, and the results are shown in Table 2.

Further, those subjected to post bake at 130° C. for 120 seconds on a hot plate after development were also observed by a scanning electron microscope at the pattern sections, and heat resistance was checked as described below, and the results are shown in Table 2.

Furthermore, those subjected to the same operation using a silicon wafer carrying a formed silicon oxide layer having a thickness of 1 μm were also subjected to post bake for 30 minutes in an oven after development. Subsequently, these were immersed in BOE (Bufferd Oxide Etchant) for 7 minutes, to conduct etching of the silicon oxide layer. Then, the sections of patterns were observed by a scanning electron microscope, and close adherence was checked as described below, and the results are shown in Table 2.

Effective sensitivity: represented by exposure amount at which 0.40 μm line and space pattern is 1:1.

Resolution: represented by minimum size of line and space pattern separating by exposure amount at effective sensitivity.

Close adherence: pattern sections were observed, and represented by a ratio X/Y of the etching amount Y along the vertical direction to the wafer surface of a silicon oxide layer to the etching amount X along pattern part direction parallel to the wafer surface. When close adherence of interface is better, the value of X/Y is smaller.

Heat resistance: pattern sections were observed, and that showing small form change is represented by ⊚, that showing round shape due to flow is represented by X, and those showing intermediate forms are represented by ◯, Δ in this order from better side, as compared with that not subjected to post bake.

TABLE 2

| Example No. | Effective sensitivity [m second] | Resolution [μm] | Close adherence | Heat resistance |
|---|---|---|---|---|
| Example 1 | 185 | 0.35 | 1.4 | ◯ |
| Example 2 | 220 | 0.35 | 1.6 | ◯ |
| Example 3 | 200 | 0.375 | 1.9 | Δ |
| Example 4 | 350 | 0.375 | 2.4 | Δ |
| Example 5 | 350 | 0.40 | 2.7 | X |
| Example 6 | 200 | 0.375 | 1.7 | ⊚ |
| Example 7 | 190 | 0.40 | 2.4 | ⊚ |
| Comparative Example 1 | 420 | 0.40 | 3.2 | X |

Examples 8 to 10, and Comparative Example 2

The following components were mixed and dissolved, further, filtrated through a fluorine resin filter having a pore diameter of 0.2 μm, to prepare a resist solution.

| Resin | |
|---|---|
| Resin A3 (solid content) | 18.57 parts |
| Resin A4 (solid content) | 81.43 parts |
| Acid generating agent | |
| Bis(cyclohexylsulfonyl)diazomethane | 2.96 parts |
| Triphenylsulfonium 2,4,6-triisoproylbenzenesulfonate | 0.37 parts |
| Quencher | |
| Dicyclohexylmethylamine | 0.15 parts |
| Tris[2-(2-methoxyethoxy)ethyl]amine | 0.15 parts |
| Compound added: Kind and quantity are shown in Table 2 | |
| Solvent | |
| Propylene glycol monomethyl ether acetate | 555.56 parts * |

* the solvent amount includes that introduced from resin solution

Marks described in the column of "added compound" in Table 3 mean the following compounds.

C2: Lipoxy PR-310 (manufactured by Showa Kobunshi K. K.)

A compound having a structural unit of the formula (IIIa) and a structural unit of the formula (IIIc) as the main component: analyzed value/solid content (non-volatile content): 64.1 wt %, acid value (solid component acid value): 57.3 mg-KOH/g)

The same procedure was repeated as in Example 1 except that the prebake temperature was changed to 100° C., to form a resist film having a thickness of 0.70 μm. The wafer on which a resist film had been thus formed was exposed through masks of various forms and dimensions using a KrF excimer stepper ["NSR 2205EX12B", manufactured by Nikon Corp., NA=0.55, σ=0.8, usual illumination exposure]. Next, PEB and development were conducted in the same manners as in Example 1, and the sections of patterns were observed by a scanning electron microscope, and sensitivity was checked as described below, resolution was checked in the same manner as in Example 1, and the results are shown in Table 3.

Further, those obtained by the same procedure, at a prebake temperature of 95° C., a thickness of a resist film of 0.87 μm and a PEB temperature of 105° C., using a silicon wafer on which a silicon oxide film having a thickness of 1 μm had been formed, were subjected to post bake in the same manner as in Example 1. Subsequently, these were immersed in a 17.1% monohydrogen difluorine ammonium aqueous solution for 4 minutes, to conduct etching of a silicon oxide layer, then, close adherence was checked in the same manner as in Example 1, and the results are shown in Table 3.

Effective sensitivity: represented by exposure amount at which 0.25 μm line and space pattern is 1:1.

TABLE 3

| Example No. | Added compound and amount thereof | Effective sensitivity [mJ/cm²] | Resolution [μm] | Close adherence |
|---|---|---|---|---|
| Example 8 | C2/0.675 parts | 30 | 0.20 | 1.9 |
| Example 9 | C2/0.135 parts | 29 | 0.20 | 1.9 |
| Example 10 | C2/1.35 parts | 30 | 0.21 | 2.5 |
| Comparative example 2 | none | 30 | 0.20 | X * |

* measurement was impossible since patterns were peeled

Example 11, and Comparative 3

The following components were mixed and dissolved, further, filtrated through a fluorine resin filter having a pore diameter of 0.2 μm, to prepare a resist solution.

| Resin | |
|---|---|
| Resin A5 (solid content) | 50.00 parts |
| Resin A6 (solid content) | 50.00 parts |
| Acid generating agent | |
| Bis(tert-butylsulfonyl)diazomethane | 3.33 parts |
| Triphenylsulfonium 2,4,6-triisoproylbenzenesulfonate | 3.33 parts |
| Quencher | |
| 2,6-diisopropylaniline | 0.22 parts |
| Added compound: Kind and quantity are described in Table 3 | |
| Solvent | |
| Propylene glycol monomethyl ether acetate | 585.19 parts ** |

** the solvent amount includes that introduced from resin solution

Close adherence was checked in the same manner as in Example 8 except that the thickness of a resist film was changed to 0.42 μm, and the results are shown in Table 4.

TABLE 4

| Example No. | Compound added and amount thereof | Effective sensitivity [mJ/cm$^2$] | Close adherence |
|---|---|---|---|
| Example 11 | C2/1.35 parts | 20 | 2.4 |
| comparative example 3 | none | 20 | 3.7 |

The resist composition of the present invention shows excellent close adherence at the interface of a substrate and a resist, improves problems in wet etching, has excellent sensitivity and resolution, and also shows excellent resist performances such as applicability, film remaining proportion, heat resistance and the like. Therefore, this composition is suitable for exposure using g line, i ling, KrF excimer laser and the like, and by this, fine resist patterns can be formed precisely.

What is claimed is:

1. A positive resist composition comprising a compound of the general formula (I):

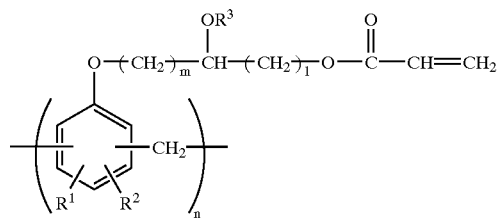

wherein, $R^1$ and $R^2$ represent each independently a hydrogen atom or an alkyl group, $R^3$ represents a hydrogen atom, alkyl group, aryl group, aralkyl group, alkenyl group, alkylcarbonyl group, arylcarbonyl group or aralkylcarbonyl group provided that the alkyl group, aryl group, aralkyl group, alkenyl group, alkylcarbonyl group, arylcarbonyl group or aralkylcarbonyl group may be optionally substituted with a carboxy group, oxycarbonyl group, hydroxyl group, alkoxy group or alkyl group, n represents an integer of 2 to 40, m represents an integer of 1 to 5, and l represents an integer of 1 to 5, and (a) an alkali soluble resin and a dissolution inhibiting agent, or (b) a resin insoluble or poorly soluble itself in an alkali aqueous solution but becoming soluble in an alkali aqueous solution by the action of an acid and an acid generating agent.

2. The composition according to claim 1, wherein the alkali-soluble resin is a novolak resin and the dissolution inhibiting agent is an o-naphthoquinone diazide compound.

3. The composition according to claim 1 wherein $R^1$ and $R^2$ represent each independently a hydrogen atom or methyl group, and $R^3$ represents a hydrogen atom, alkylcarbonyl group having 2 to 10 carbon atoms, arylcarbonyl group having 7 to 15 carbon atoms or aralkylcarbonyl group having 7 to 15 carbon atoms.

4. The composition according to claim 1 wherein $R^3$ represents a hydrogen atom.

5. The composition according to claim 1 wherein a part or all of $R^3$ is a group of the formula (II).

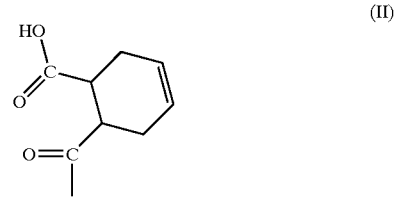

6. The composition according to claim 1, wherein the compound of the general formula (I) has a weight-average molecular weight in terms of polystyrene of 500 to 20000 measured by GPC.

7. The composition according to claim 1, wherein the acid generating agent is contained in an amount of 0.3 to 30 parts by weight and the compound of the general formula (I) is contained in an amount of 0.2 to 50 parts by weight based on 100 parts by weight of the resin insoluble or poorly soluble itself in an alkali aqueous solution but becoming soluble in an alkali aqueous solution by the action of an acid.

8. The composition according to claim 1, further comprising a basic nitrogen-containing organic compound.

9. A positive resist composition comprising a compound of the general formula (I):

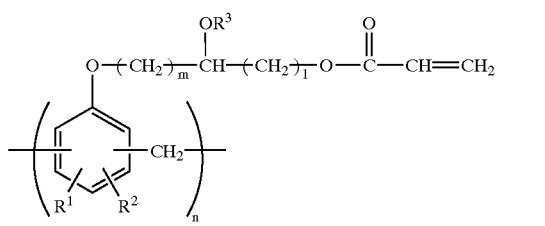

wherein, $R^1$ and $R^2$ represent each independently a hydrogen atom or an alkyl group, $R^3$ represents a hydrogen atom, alkyl group, aryl group, aralkyl group, alkenyl group, alkylcarbonyl group, arylcarbonyl group or aralkylcarbonyl group provided that the alkyl group, aryl group, aralkyl group, alkenyl group, alkylcarbonyl group, arylcarbonyl group or aralkylcarbonyl group may be optionally substituted with a carboxy group, oxycarbonyl group, hydroxyl group, alkoxy group or alkyl group, n represents an integer of 2 to 40, m represents an integer of 1 to 5, and l represents an integer of 1 to 5, and (a) an alkali soluble resin and a dissolution inhibiting agent, or (b) a resin insoluble or poorly soluble itself in an alkali aqueous solution but becoming soluble in an alkali aqueous solution by the action of an acid generating agent.

* * * * *